(12) United States Patent
Kim

(10) Patent No.: US 6,425,628 B1
(45) Date of Patent: Jul. 30, 2002

(54) LUGGAGE RESTRAINING STRUCTURE

(75) Inventor: Yong Dae Kim, Gwangmyeong (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 09/733,267

(22) Filed: Dec. 8, 2000

(30) Foreign Application Priority Data

Aug. 1, 2000 (KR) ........................... 2000-44632

(51) Int. Cl.⁷ ................................ B60N 2/02
(52) U.S. Cl. .................... 296/203.04; 296/37.16; 296/188
(58) Field of Search .................. 296/37.16, 24.1, 296/203.04, 188, 204

(56) References Cited

U.S. PATENT DOCUMENTS 4,270,790 A * 6/1981 Curotto ................. 296/37.16
5,018,780 A * 5/1991 Yoshii et al. .......... 296/203.04
5,716,091 A * 2/1998 Wieczorek ............... 296/37.16
6,131,984 A * 10/2000 Matusushita ....... 296/203.04 X

* cited by examiner

Primary Examiner—Joseph D. Pape
(74) Attorney, Agent, or Firm—Christie, Parker & Hale, LLP

(57) ABSTRACT

The luggage restraining structure comprises a safety block fixed by securing elements between a rear folding seat and a trunk, the trunk being formed behind the rear folding seat which is collapsible and easy to keep. The luggage restraining structure prevents the luggage from bouncing into the passenger area by the force of inertia of luggage loaded in the trunk in the event of a sudden stop or rear-on collision, thereby protecting the passengers against the impact energy of luggage.

2 Claims, 1 Drawing Sheet

LUGGAGE RESTRAINING STRUCTURE

CROSS REFERENCE TO RELATED APPLICATIONS

This application claims priority of Korean application No. 2000-44632, filed Aug. 1, 2000.

BACKGROUND OF THE INVENTION

1. Field of the Invention

This invention relates to a luggage restraining structure for vehicles, and more particularly, to a safety block fixed between the rear seat and the trunk of the vehicle to prevent the luggage in the trunk from bouncing into the passenger area in the event of a sudden stop or a rear-on collision, thereby protecting the passengers.

2. Description of the Prior Art

Conventional vehicles that have a rear folding seat are provided with a trunk behind the rear seat of the vehicle for luggage or storage. A tail gate door is provided on the rear so it can be opened for putting luggage and/or other article(s) in and out of the trunk, and the back of the rear seat is constructed to fall forward.

In this type of car, when the back of the rear seat is pushed forward and folded on the seat cushion, luggage can be loaded in the trunk. In the event of a sudden stop or a rear-on collision, if the luggage loaded is relatively heavy, the force of inertia of the luggage can detach the rear seat from the trunk floor panel and throw the luggage into the passenger area, thereby subjecting the passengers to the hazard of luggage shifting from the rear of the vehicle to the front into the passenger area.

SUMMARY OF THE INVENTION

Accordingly, the principle object of the present invention is to provide a trunk and a vehicle with a trunk that prevents the luggage loaded in the trunk from shifting from the rear of the vehicle to the front into the passenger area by the force of inertia in the event of a sudden stop or rear-on collision.

The other object of the present invention is to provide a trunk that improves the security of the passengers and the reliability of the vehicle.

In accomplishing these objects, according to one preferred embodiment of the present invention, a safety block for absorbing impact energy of luggage is provided. It is fixed by securing elements such as screws between the rear folding seat and the trunk. The trunk is formed on the trunk floor panel behind the rear folding seat which is collapsible and easy to keep.

Therefore, the present invention prevents luggage loaded in the trunk from being thrown into the passenger area by the force of inertia of luggage in the event of a sudden stop or rear-on collision, thereby improving the security of the passengers and the reliability of the vehicle.

BRIEF DESCRIPTION OF THE DRAWINGS

The present invention will be more fully explained from the detailed description given hereinbelow and the accompanying drawings which are given by way of illustration only, and thus, are not limitative of the present invention, and wherein.

DESCRIPTION OF THE PREFERRED EMBODIMENTS

Figure 1:
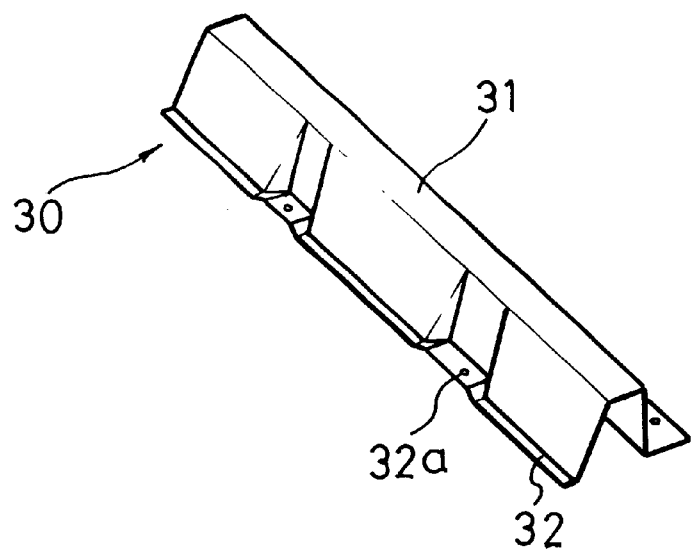
FIG. 1 is a perspective view of the present invention.
Figure 2:
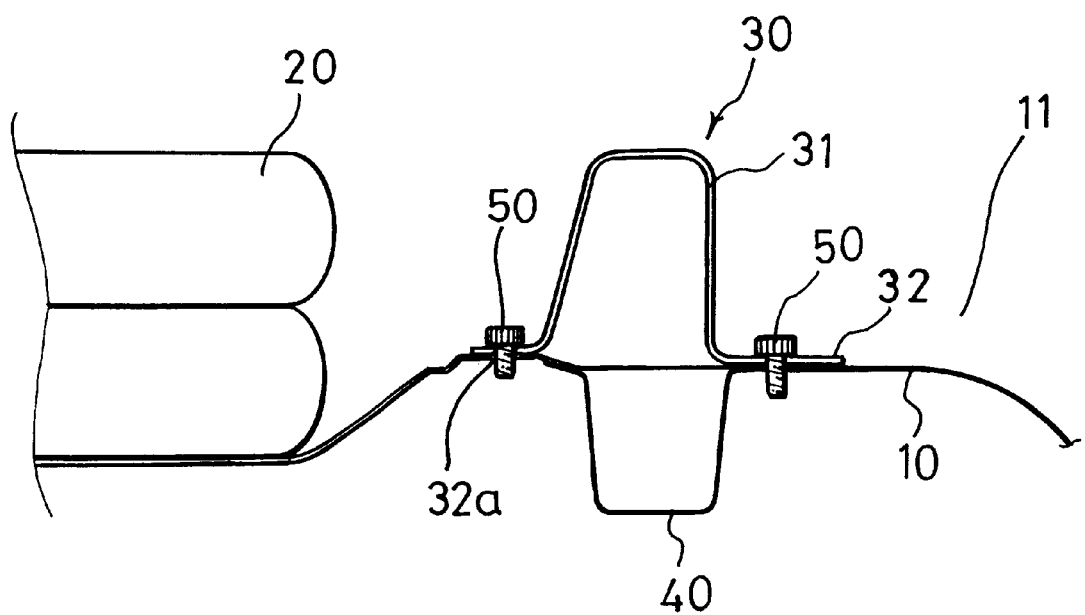
FIG. 2 is a cross sectional view showing the installation of the present invention.

As shown in FIGS. 1 and 2, the present invention is a hatch-back style car or vehicle wherein a rear folding seat 20 is collapsible.

The rear folding seat 20 can be folded by necessity of the user, so that it may permit extended luggage space in the trunk 11, as shown in FIG. 2.

In such a vehicle, the trunk 11 which is formed on the trunk floor panel 10 behind the rear folding seat, 20 acts as luggage space. In the event of a sudden stop or rear-on collision, the force of inertia forces the luggage loaded in the trunk 11 to frequently shift to the front of the vehicle.

Since the rear folding seat 20 is collapsed when the luggage shifts to the front of the vehicle, the passengers are subject to contact with the luggage and which could lead to injury.

In order to overcome the above disadvantages, the present invention is provided with a safety block 30 for absorbing the impact energy of luggage, which is fixed via securing elements such as screws 50 between the rear folding seat 20 and the trunk 11.

Accordingly, in the event of a sudden stop or collision, even though the luggage shifts forward by the force of inertia thereof, it cannot shift forward any longer by a protrusion 31 formed on the safety block 30.

The safety block 30 includes a protrusion 31 and a pair of engagements 32. The protrusion 31 protrudes upward convexly, and is bent downward on the opposite side to be integral with the pair of engagements 32. At the engagements 32, at least one threaded hole 32a is formed for engagement with a screw 50.

The engagement 32 is fixed to the upside of the trunk floor panel 10 by the screw 50 through the thread hole 32a.

The present invention further includes a reinforcement 40 welded to the underside of the trunk floor panel 10. The reinforcement 40 effectively absorbs and disperses the impact energy of luggage to prevent deformation of the safety block 30, even though excessive impact energy is exerted on the safety block 30.

Accordingly, the present invention prevent the luggage loaded in the trunk 11 from shifting from the rear of the vehicle to the front into the passenger area by the force of inertia of luggage in the event of a sudden stop or rear-on collision, thereby improving the security of passengers.

Additionally, the present invention includes the safety block 30 fixed to the upside of the trunk floor panel 10 and the reinforcement 40 fixed to the underside of the trunk floor panel 10 in the trunk 11, so that it reinforces the vicinity of the trunk 11, thereby protecting the passengers against the impact energy of luggage.

The present invention is not limited to these embodiments, and it should be clear to those skilled in the art that other embodiments are possible within the spirit and scope of the invention claimed.

What is claimed is:

1. Luggage restraining structure comprising a safety block fixed between a rear folding seat and a trunk, the trunk being formed on the trunk floor panel behind the rear folding seat which is collapsible and easy to keep, the safety block extending substantially upwardly above a level of the trunk floor panel and including an upwardly rising protrusion with a front facing wall and a substantially vertical trunk facing wall to block any objects on the trunk floor from sliding forwardly into contact with the rear folding seat during a rear end collision and a pair of engagements extended from lower ends of the front facing and trunk facing walls of the protrusion, the engagements having a plurality of thread holes formed therein for attaching the safety block with screws to an upper side of the trunk floor panel, and a reinforcement which is welded to an underside of the trunk floor panel and protrudes downwardly below the safety block, the reinforcement being for absorbing any excess shock transferred to the protrusion by objects in the trunk impinging thereon to thereby prevent deformation of the safety block.

2. A vehicle having a collapsible rear folding seat, a trunk behind the seat having a trunk floor panel at a first, lower level, and a luggage restraining structure, the luggage restraining structure comprising a safety block fixed by securing elements between the rear folding seat and the trunk on the trunk floor panel behind the rear folding seat, the safety block extending substantially upwardly above a level of the trunk floor panel and including an upwardly rising protrusion with a front facing wall and a substantially vertical trunk facing wall for blocking objects on the trunk floor from sliding forwardly into contact with the rear folding seat during a rear end collision, and a pair of engagements extended from lower ends of the front facing and trunk facing walls of the protrusion, the engagements having a plurality of thread holes formed therein for attaching the safety block with screws to an upper side of the trunk floor panel, and a reinforcement which is welded to an underside of the trunk floor panel and protrudes downwardly below the safety block, the reinforcement being for absorbing any excess shock transferred to the protrusion by objects in the trunk impinging thereon to thereby prevent deformation of the safety block.

* * * * *